Dec. 11, 1923.
C. O. WALPER
1,476,938
MEANS AND METHOD FOR PREPARING PLASTIC COMPOSITIONS
Filed Aug. 3, 1922
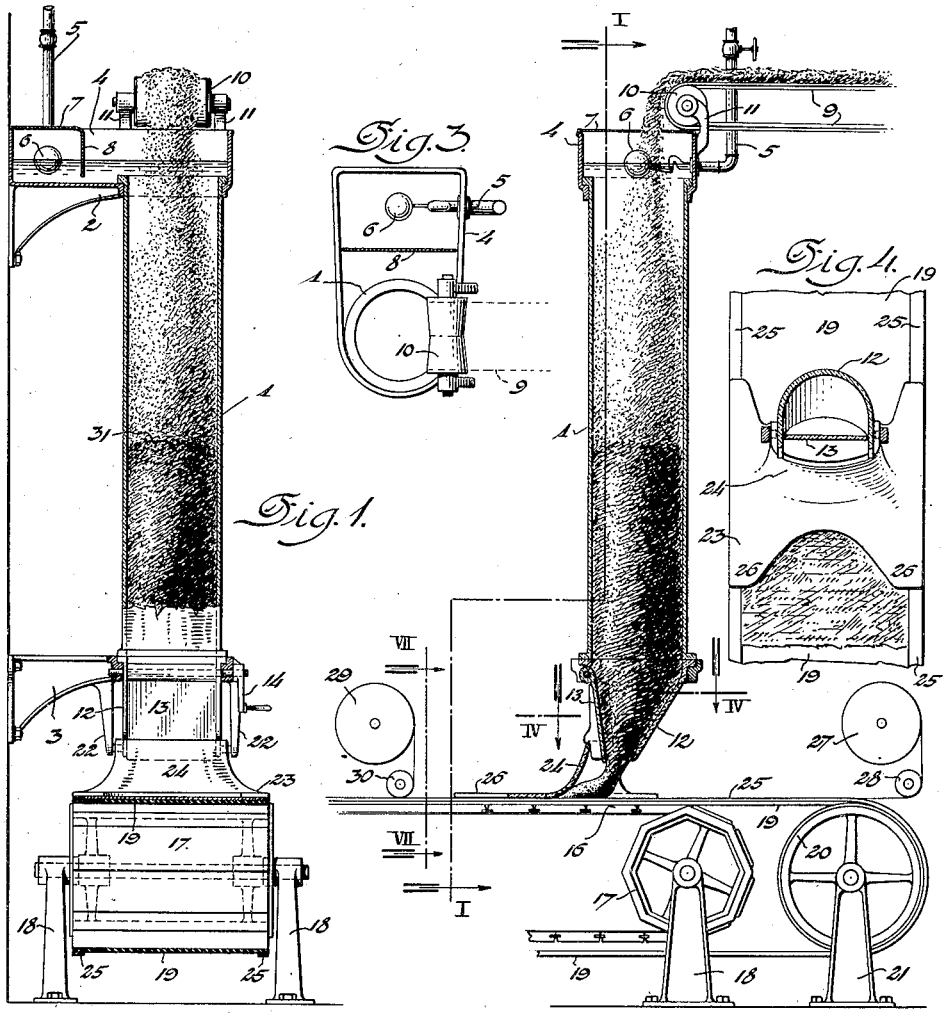
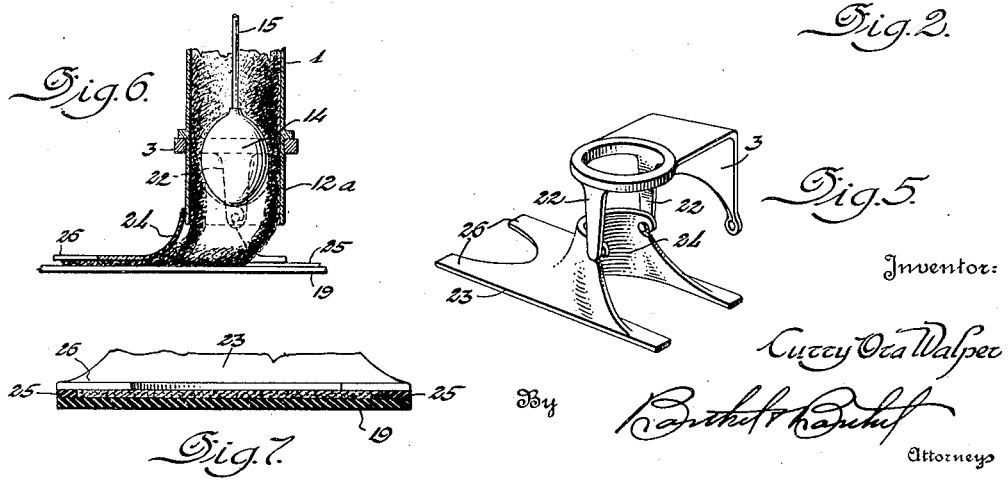

Patented Dec. 11, 1923.

1,476,938

UNITED STATES PATENT OFFICE.

CURRY ORA WALPER, OF DETROIT, MICHIGAN, ASSIGNOR, BY DIRECT AND MESNE ASSIGNMENTS, TO STANDARD PLASTERING SYSTEM, OF DETROIT, MICHIGAN, A CORPORATION OF MICHIGAN.

MEANS AND METHOD FOR PREPARING PLASTIC COMPOSITIONS.

Application filed August 3, 1922. Serial No. 579,538.

*To all whom it may concern:*

Be it known that I, CURRY ORA WALPER, a citizen of the United States of America, residing at Detroit, in the county of Wayne and State of Michigan, have invented certain new and useful Improvements in Means and Methods for Preparing Plastic Compositions, of which the following is a specification, reference being had therein to the accompanying drawings.

This invention relates to a means and method for preparing plastic compositions containing gypsum, particularly plastic compositions intended for use as wall boards and gypsum blocks.

It has for its primary object the provision of a mixing chamber containing water into the top of which the mixture containing gypsum may be placed and from the bottom of which the mixture may be withdrawn when it has attained the proper consistency.

A further object of the invention is to provide a device into which the dry mixture containing gypsum may be deposited continuously and from which the wet mixture may be withdrawn continuously.

A still further object of the invention is to provide means by which the wet plastic mixture may be spread in a layer of uniform thickness having surface layers of paper or other fabric, or with embedded metallic reinforcements.

To these and other ends, the invention consists in the novel means and method more fully hereinafter described, a preferred embodiment being illustrated in the accompanying drawings.

Figure 1 is a vertical section taken on the line I—I of Fig. 2;

Fig. 2 is a section at right angles to that of Fig. 1, parts being shown in elevation;

Fig. 3 is a plan view of the upper portion of the device;

Fig. 4 is a plan view of the spreading means, including a sectional view of the lower end of the mixing chamber taken on the line IV—IV of Fig. 2;

Fig. 5 is a perspective view of a supporting bracket and the spreading device;

Fig. 6 is a fragmentary section of a modification, and

Fig. 7 is a section on the line VII—VII of Fig. 2, parts being broken away.

Many forms of plaster boards are now in use in which the plastic composition consists of various mixtures containing gypsum which has been heated to a greater or less degree. When gypsum is raised to a temperature of 120° C. and maintained at that temperature for a sufficient length of time it loses the equivalent of one and one-half molecules of water and forms a hemihydrate as a white powder called plaster of Paris. However in the ordinary process of manufacture this theoretical dehydration is not completely brought about, or subsequent absorption of moisture occurs, so that the products sold as "gypsum," "stucco," or "plaster" consist of various mixtures of calcium sulphate, hemihydrate, dihydrate or anhydrous, together with various inert materials derived from the rock which contains the gypsum.

Different grades of gypsum take up water at different rates of speed to acquire the characteristic set caused by the formation of a mass of interlacing needle-like crystals of the dihydrate.

In the ordinary process of manufacture of plaster boards it has been the custom to pour the water into the dry gypsum composition while stirring the mass with various devices, such as rakes or mechanically operated paddles or wires. The operation is not continuous and after the various batches of materials have been mixed, frequent cleaning of the tools and containers is necessary due to the fact that portions of the mixture are not completely removed from the tools or utensils and when these portions become hard they interfere with the mixing of subsequent batches.

According to the present invention there is provided a vertical column of water into the top of which the dry mixture containing gypsum heavier than water is placed by any suitable means and as the materials settle down through the water all portions of the mixture become thoroughly wet. The mass which settles into the bottom of the column quickly reaches a consistency suitable for use as a plastic mixture and by providing a suitable gateway or outlet at the bottom of the column the wet mass will flow out under the pressure due to gravity. Beneath the outlet any suitable receptacle or conveying means may be placed according to the use to which the plastic composition is to be applied.

In the drawings the column of water is contained in a tubular chamber 1 which may be of glass or of metal or pottery having the interior surface glazed. The chamber 1 is supported at its upper and lower ends by suitable bracket members 2 and 3; the upper bracket member 2 will preferably be formed with a portion thereof constituting a tank 4 into which water enters through a suitable pipe 5 controlled by a float valve 6. The valve 6 is preferably located at a little distance from the upper end of the chamber 1 and protected by a cover member 7 having a downwardly extending wall 8, the lower end of which lies below the level of the water in the tank. A conveyer belt 9 is mounted to discharge the material carried thereby upon the surface of the water above the upper open end of the chamber 1. As shown in Figs. 1 and 2, the roller 10 at the end of the belt is supported upon bracket arms 11 secured to the bracket member 2. At the lower end of the chamber 1 an outlet member 12 is mounted upon the bracket member 3. A movable gate 13 which may be operated by a handle 14, controls the size of the opening at the bottom of the outlet member 12 or in the modification shown in Fig. 6, the outlet member 12$^a$ may be provided with an inflatable bulb 14 supplied with air through a suitable pipe 15, the bulb 14 acting as a valve member, permitting the plastic material to flow out through the annular space left between the sides of the bulb 14 and the walls of the outlet member 12$^a$.

When the material is to be used for making plaster boards, a conveyor is placed beneath the discharge opening and as shown in Fig. 2, this conveyor may consist of a slatted belt 16 carried by a drum 17 rotatably supported upon standards 18 and a belt 19 preferably having a rubber surface carried by a drum 20 rotatably carried by standards 21. The bracket member 3 may have downwardly projecting arms 22 adapted to engage and support a spreader member 23 located above the surface of the belt 19. The spreader member 23 will preferably be formed with an upwardly extending portion 24 having a curved surface adapted to engage the plastic mass deposited upon the surface of the belt 19 and to spread the mass laterally to the full width of the belt between the upstanding strips 25 formed upon or secured to the belt 19. The rear end of the spreader member 23 is formed with arms 26 having their confronting edges formed as curves extending outwardly from the center line of the belt 19 toward the edge strips 25. The function of these arms 26 having their edges extending at an angle to the path of movement of the belt is to cause a spreading action of the plastic mass. The member 23 may be made of glass, or of metal or pottery having a glazed surface so that the gypsum composition will not adhere thereto, but will be left with a smooth surface as the belt moves out of contact with the spreader arms 26.

A roll of paper 27 is arranged in front of the outlet member 12, a guide roller 28 being provided to hold the paper so that it will lie flat upon the belt 19 to receive the plastic mass upon its upper surface and a roll of paper 29 is arranged in the rear of the spreader member 23, a guide roller 30 being provided to guide the paper from the roll 29 into position upon the top of the plastic composition. In this manner a wall board will be formed having paper adhering to its front and back faces. The material carried by the conveyor members 16 and 19 will be cut into any desired lengths by any suitable mechanism (not shown). Instead of paper, a wire reinforcing fabric may be carried by each of the rollers 27 and 29 for the production of that type of wall board in which a fireproof composition is reinforced by a metallic fabric.

By the mechanism described a continuous flow of plastic material of the proper consistency may be obtained by adjusting the relative rate of speed of the conveyors 9 and 19 and the size of the outlet will be correspondingly adjusted, either by means of the gate 13 or the valve member 14.

By the arrangement shown there will be no surfaces to which the wet mixture will adhere and since the flow is continuous the gypsum should never acquire a set within the apparatus. At the close of work or whenever the operation of the machinery is to be discontinued, all of the wet plastic mass will be withdrawn from the chamber 1. After the walls of the chamber have been cleaned the supply of water through the pipe 5 may be shut off and the water also withdrawn from the chamber 1, so that the apparatus will be in perfect condition to resume work when desired. The cover 7 with its wall 8 will protect the float valve 6 from dust which might otherwise be deposited thereon from the material being carried into the chamber 1 by the belt 9.

It has been found that a gypsum mixture allowed to settle freely through a column of water into a mass at the bottom of the water will take up as much water as is necessary to produce the proper setting of the material after it has been spread out into a sheet such as is used for wall boards. The wet mass is so much heavier than water that a distinct line 31 can be observed through the glass wall of the column 1 to indicate the top of the semi-solid mass which is in condition for withdrawal. Where the chamber 1 is not made entirely of glass a suitable window should be provided in the side wall of the metallic or pottery cylinder used instead of the glass.

It will be obvious that many modifications may be made in the details of construction without departing from the principle involved or sacrificing any of the advantages of this invention. It is therefore intended that the invention shall be understood as covering any form of device having the same principle of operation, however unlike the structure may be in appearance to the specific design herein illustrated. It is to be noted that the present device has an advantage of maintaining a considerable body of water between the stream of dry material poured upon the surface and the walls of the chamber. Thus there will be no sticking of the material to the side walls of the top portion of the chamber and before the plastic material comes into contact with the side walls it will have absorbed so much water that it will no longer have a tendency to adhere to the smooth glazed surface. The final mixture saturated with water does not engage any part of the apparatus at the top.

As the material settles in the lower portion of the tube a certain packing will occur, the lower portions becoming denser so that the excess of water will be pressed out of the lower portion of the mass and there will be sufficient friction and resistance to movement of the plastic mass to prevent excessive rapidty of outflow through the bottom portion. It is essential that this semi-solid mass be maintained at a certain head to obtain the proper consistency of the lower portion of the mass as well as to prevent an outrush of water such as would occur with an unduly limited quantity of the plastic composition.

A further advantage of this method of bringing the dry material and water into intimate contact lies in the fact that the anhydrous or hemihydrate gypsum has the peculiar property of assuming its crystalline form somewhat more rapidly when stirred or otherwise mechanically agitated than when the material is allowed to absorb water without agitation. If the formation of crystals begins and the mixture is then stirred the crystals that have formed will be broken, and the final product will not have the same hardness or texture that is attained by the same material when it is allowed to harden without being stirred.

In a device such as the one herein described the dry material passing downward through the water has every portion brought into contact with the water as it sinks through the column and as the mass reaches the bottom the action of gravity causes the lower portions to become more compact, the water being gently pressed out from the mass until the lowermost layers are so thick that they require considerable pressure to cause them to flow. This pressure is supplied by the weight of the upper portion of the semi-compact plastic mixture together with the weight of the column of water superimposed thereon in the chamber. The material squeezed out at the bottom is removed before the formation of crystals has actually begun and when the hydration occurs the mass has a maximum hardness and resiliency.

It is believed that this absence of mechanical agitation is one of the most important factors in securing the high quality of the resultant product.

I claim:—

1. A device for preparing plastic compositions comprising a chamber having means for maintaining water therein at substantially constant level to receive dry material continuously, and means permitting continuous withdrawal of the wet material from the bottom of the chamber.

2. In a device for preparing plastic compositions, a chamber for holding water, means to maintain the water therein at substantially a constant level, and means to supply dry material at the top of the water, said chamber having an outlet at the bottom for the material wet by its passage through the water.

3. A device for preparing plastic compositions comprising a chamber having an outlet at its lower end and adapted for the passage therethrough of water and plastic material, and means for maintaining in said chamber a column of water of a height such that material capable of absorbing water to form a hydrated compound will during its descent through the column absorb sufficient water to cause proper hydration.

4. A device as in claim 3 having means for supplying dry material at the upper portion of the column of water.

5. A device as in claim 3 in which the portions of the chamber in contact with the plastic material have a glazed surface.

6. In a device for preparing plastic compositions, a chamber having an outlet at the bottom for the continuous passage of material, means to maintain a substantially constant level of water therein, and means to supply dry material upon the water for descent by gravity through the water and through the bottom outlet.

7. A device as in claim 6 in which the walls of said chamber have a non-absorbent surface such as glass to prevent the material from adhering thereto.

8. A device as in claim 6 having a conveyor beneath the outlet to receive the wet plastic material, and means for spreading the material in a layer of substantially uniform thickness upon the conveyor.

9. In a device for preparing plastic compositions, a chamber having an outlet at the bottom for the continuous passage of material, means to maintain a substantially constant level of water therein, means to supply dry material upon the water for descent by gravity through the water and through the bottom outlet, a conveyor beneath the outlet, means in advance of the outlet to supply reinforcing material upon the conveyor to receive the wet plastic material, and means for spreading the material in a layer of substantially uniform thickness upon the conveyor.

10. A device as in claim 9 having means behind the spreading means to supply reinforcing material upon the upper surface of the wet plastic material upon the conveyor.

11. In a device for preparing plastic compositions, a chamber having an outlet at its lower end for the continuous passage of plastic material, means for maintaining water at a substantially constant level in said chamber, means to supply dry material upon the water in said chamber, a conveyor belt beneath the outlet, and a spreading means above the belt and at the rear of the outlet adapted to engage the wet plastic material and to spread it in a layer of substantially uniform thickness upon the conveyor.

12. In a device for preparing plastic compositions, a conveyor, means for supplying to the conveyor a continuous flow of plastic material capable of acquiring a set by taking up water, and a spreading means adapted to engage the plastic material to spread it upon the conveyor, said spreading means having a non-absorbent surface, such as glass.

13. The process of preparing a plastic composition which consists in placing dry material capable of absorbing water upon the surface of a column of water and removing the wet material from the bottom of the column of water.

14. The process of preparing plastic compositions which consists in placing material capable of taking up water to form a hydrated compound upon the surface of water and after the material has been in contact with the water for a sufficient length of time to absorb the proper amount of water, withdrawing the material from the bottom of the water.

15. The process of preparing a plastic composition which consists in supplying dry material capable of taking up water to form a hydrated compound, continuously to the surface of water and after the material has been in contact with the water for a sufficient length of time to take up the proper amount of water, withdrawing the wet material continuously from the bottom of the water.

16. The process of preparing a plastic composition which consists in supplying continuously to the surface of water a material capable of taking up water to form a hydrated compound and after the material has descended by gravity through the water for a sufficient distance to take up the required quantity of water, removing the wet plastic material from the bottom of the water.

17. The process of preparing a wall board which consists in placing dry material capable of absorbing water to form a hydrated compound continuously upon the surface of water and after the material has descended by gravity through the water for a sufficient distance to take up the proper amount of water, withdrawing the material continuously from beneath the water to the surface of a conveyor and spreading the material thereon to a substantially uniform thickness.

In testimony whereof I affix my signature in presence of two witnesses.

CURRY ORA WALPER.

Witnesses:
ARTHUR MINNICK,
EMMA DECLERCQ.